United States Patent
Durand et al.

(10) Patent No.: US 9,290,259 B2
(45) Date of Patent: Mar. 22, 2016

(54) AIRCRAFT NOSE WITH COCKPIT AND AVIONICS BAY MODULES INTEGRATED THEREIN

(71) Applicant: Airbus Operations (SAS), Toulouse (FR)

(72) Inventors: Yves Durand, Aussonne (FR); Bernard Guering, Montrabe (FR)

(73) Assignee: Airbus Operations (SAS), Toulouse (FR)

( * ) Notice: Subject to any disclaimer, the term of this patent is extended or adjusted under 35 U.S.C. 154(b) by 200 days.

(21) Appl. No.: 14/138,551

(22) Filed: Dec. 23, 2013

(65) Prior Publication Data

US 2014/0175224 A1   Jun. 26, 2014

(30) Foreign Application Priority Data

Dec. 21, 2012   (FR) ...................... 12 62589

(51) Int. Cl.
| | | |
|---|---|---|
| *B64C 1/00* | (2006.01) | |
| *B64C 1/18* | (2006.01) | |
| *B64D 11/00* | (2006.01) | |
| *B64D 43/00* | (2006.01) | |
| *B64F 5/00* | (2006.01) | |

(52) U.S. Cl.
CPC ... *B64C 1/00* (2013.01); *B64C 1/18* (2013.01); *B64D 11/00* (2013.01); *B64D 43/00* (2013.01); *B64F 5/0009* (2013.01); *Y10T 29/49826* (2015.01)

(58) Field of Classification Search
CPC ............ B64C 1/00; B64C 1/18; B64D 11/00; B64D 43/00
USPC .................................................. 244/120, 119
See application file for complete search history.

(56) References Cited

U.S. PATENT DOCUMENTS

| | | | | |
|---|---|---|---|---|
| 2,702,680 A | * | 2/1955 | Heinemann ............ | B64D 25/12 102/372 |
| 3,999,728 A | * | 12/1976 | Zimmer ................. | B64D 25/12 244/140 |
| 6,065,720 A | * | 5/2000 | Ash ....................... | B64F 5/0009 244/118.2 |
| 6,497,388 B1 | * | 12/2002 | Friend ..................... | B64C 1/068 244/120 |
| 8,100,362 B2 | * | 1/2012 | Guering ................. | B64C 1/068 244/118.2 |
| 2010/0059626 A1 | * | 3/2010 | Cazals .................. | B64C 1/0009 244/119 |
| 2014/0175223 A1 | | 6/2014 | Durand et al. | |
| 2014/0175225 A1 | | 6/2014 | Durand et al. | |

FOREIGN PATENT DOCUMENTS

| | | |
|---|---|---|
| EP | 0900726 | 3/1999 |
| FR | 2933375 | 1/2010 |

OTHER PUBLICATIONS

French Search Report, Aug. 8, 2013.

* cited by examiner

*Primary Examiner* — Justin Benedik
(74) *Attorney, Agent, or Firm* — Greer, Burns & Crain, Ltd.

(57) ABSTRACT

An aircraft nose comprising a primary fuselage structure, and housed inside said structure, a cockpit, and an avionics bay containing a plurality of avionics racks designed to receive electrical and/or electronic equipment. The cockpit and the avionics bay are each made in the form of a distinct module that is suitable for being installed in a single operation inside the primary fuselage structure. The use of modules for integrating in the aircraft nose makes it possible to reduce considerably the time required for fitting out the nose on the final assembly line of the aircraft.

21 Claims, 5 Drawing Sheets

AIRCRAFT NOSE WITH COCKPIT AND AVIONICS BAY MODULES INTEGRATED THEREIN

CROSS-REFERENCES TO RELATED APPLICATIONS

This application claims the benefit of the French patent application No. 1262589 filed on Dec. 21, 2012, the entire disclosures of which are incorporated herein by way of reference.

BACKGROUND OF THE INVENTION

The invention relates to an aircraft nose and to a method of fitting out such a nose.

Figure 1:
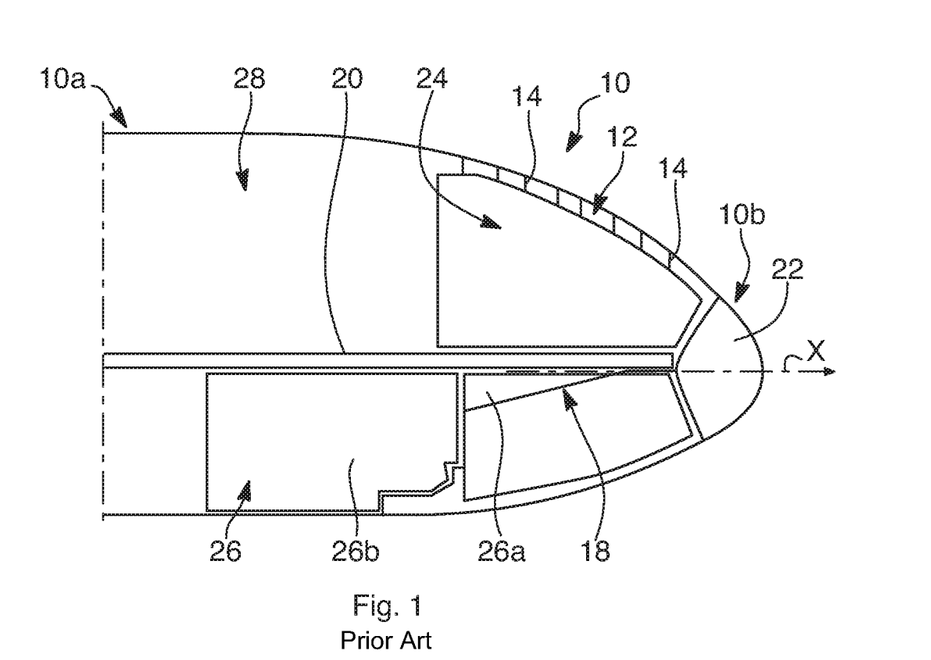
FIG. 1 (described above) is a general diagram in longitudinal section of a prior art aircraft nose.

FIG. 1 shows a nose of a prior art aircraft 10, which nose includes a primary fuselage structure 12.

The primary structure 12 comprises in particular a plurality of fuselage frames 14 arranged parallel to one another along the longitudinal axis X of the nose. Only the top portions of the fuselage frames 14 are shown for reasons of clarity.

The structure 12 also has a bay 18 for storing the nose landing gear (not shown) of the aircraft.

The primary fuselage structure 12 defines a space inside the structure that is to be fitted out.

More particularly, a cabin floor 20 extends longitudinally from the rear end 10a of the nose to a radome zone 22 situated at the front end 10b of the nose.

The floor 20 subdivides the inside space for fitting out into an upper space and a lower space.

A zone dedicated to the cockpit 24 is for fitting out in the upper space above the landing gear bay 18.

A zone dedicated to an avionics bay 26, referred to as an "electric and electronic bay" or "E&E bay" is to be fitted out in the bottom space. This zone comprises a "front" zone 26a including a landing gear bay 18 (under the cockpit zone 24) and a "rear" zone 26b situated in part under the cockpit zone 24 and under the floor 20 of the top face 28 that is dedicated to a passenger cabin.

Figure 2:
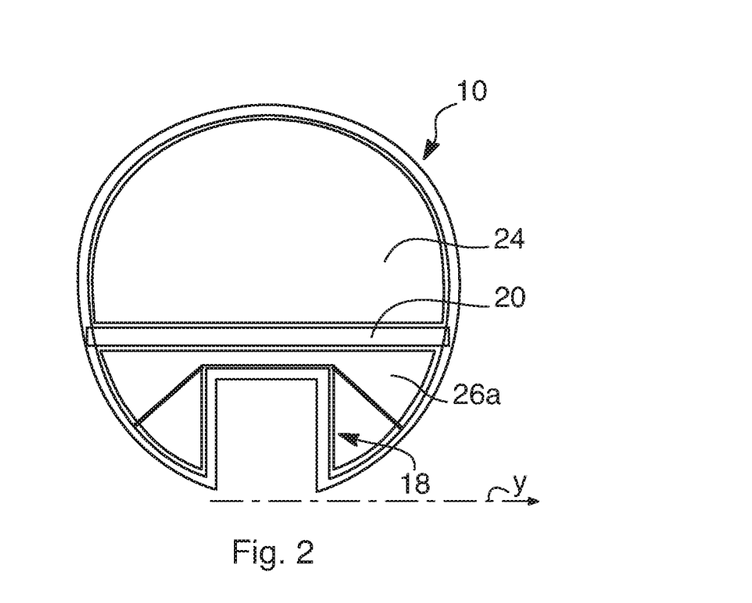
FIG. 2 (described above) is a general diagrammatic view in cross-section of the FIG. 1 nose.

In the zone 26a, the space left empty around the landing gear bay 18 is of shape that varies both longitudinally (FIG. 1) and transversely, as can be seen in the cross-section of FIG. 2. Access to this small empty space is relatively difficult.

Integrating avionics racks and electrical and/or electronic equipment and systems in such a zone is therefore found to be lengthy and tedious.

Furthermore, it takes a relatively long time to fit out the rear zone 26b and the zone 24 dedicated to the cockpit. The avionics systems and racks that incorporate electrical and/or electronic equipment are put into place one by one in the zone in question and are then connected (for electricity, air, . . . ) to one another and also to electrical systems and air duct systems installed in the primary structure 12.

The various above-mentioned tasks require a relatively long period of integration time on the assembly line for the nose. It would be advantageous to be able to shorten this integration time.

SUMMARY OF THE INVENTION

To this end, the present invention proposes an aircraft nose comprising a primary fuselage structure, and housed inside said structure:

a cockpit; and an avionics bay containing a plurality of avionics racks receiving electrical and/or electronic equipment;

the nose being characterized in that the cockpit and the avionics bay are each made in the form of a module that is suitable for being installed in a single operation inside the primary fuselage structure.

Installing or integrating these two added modules inside the primary fuselage structure (one module for the cockpit and one module for the avionics bay) makes it possible to achieve a considerable saving in integration time. Before the integration stage, these modules are made outside the aircraft away from the final assembly line.

Each of these modules then behaves as a single object during the integration stage.

Prior to being installed in the nose, each module has been designed so as to form a structure that comprises, in particular: a set of racks enabling it to receive various pieces of electrical and/or electronic equipment together with most of that equipment (a predetermined amount thereof as defined in advance during the design of the module) already installed in the racks together with the interconnections between those pieces of equipment and their connections with ventilation systems (air ducts, couplings, . . . ). Thus, each pre-equipped module is installed inside the primary fuselage structure in a single operation. More particularly, there are installed firstly a cockpit module at a first location reserved for that purpose in the nose in order to constitute the cockpit, and secondly an avionics bay module in a second location reserved for that purpose in the nose in order to constitute the avionics bay.

It should be observed that it is easier to mount two distinct modules inside the primary fuselage structure than it is to mount a single module combining both of those modules.

The volume of a single module would make it very difficult to integrate in the primary structure.

Furthermore, given the different natures of the locations to be fitted out:

the cockpit location in a zone of rapidly varying cross-section in the top portion; and the avionics bay location situated in a zone of almost constant cross-section;

two distinct modules are preferable to a single module.

According to a possible characteristic, each module comprises a plurality of elements fastened to one another in such a manner as to form an assembly that is suitable for being moved as a unit.

The module is thus made up of an assembly of elements or parts (racks, pieces of electrical and/or electronic equipment, interconnection elements between those pieces of equipment mounted on the racks, ventilation systems elements, . . . ) connected or assembled together so as to give the assembly mechanical cohesion enabling it to be handled as a single physical entity or object.

These various module elements are arranged in an unchanging predetermined configuration which is the configuration they are to have once the module has been integrated in the primary fuselage structure.

According to other possible characteristics that may be taken in isolation or in combination with one another:

the cockpit module and the avionics bay module together incorporate nearly all of the functions performed by the cockpit and the avionics bay;

the cockpit module incorporates most of the functions performed by the cockpit and some of the functions of the avionics bay, and the avionics bay module incorporates most of the functions performed by the avionics bay;

the shape of each module is adapted firstly to being transported through a top space inside the primary fuselage structure, and secondly to the location in the primary fuselage structure in which it is integrated;

the avionics bay module extends towards the rear of the nose under a portion of a top space dedicated to a passenger cabin, and it is situated at a height that is lower than the height of the cockpit module (arrangement of two modules that are offset longitudinally and in height); the avionics bay module is generally more regular in shape than the cockpit module since it is integrated in a bottom space of cross-section that is almost constant over the entire length in which the module is integrated; the racks, and the electrical and/or electronic equipment that used to be arranged in the front zone of the bottom deck situated under the cockpit and in the rear zone of the avionics bay are now nearly all shared between the two modules; there is therefore no longer any need to integrate racks, elements, and equipment in the front zone to which access is made difficult by the presence of the bay for storing the landing gear;

the avionics bay module includes a roof incorporating the floor of the above-mentioned portion of the cabin space; having the cabin floor that is situated vertically above the avionics bay module incorporated therein simplifies and accelerates the overall process of fitting out the nose;

inside the primary fuselage structure, the nose includes an aircraft cabin floor arranged under the top space dedicated to a passenger cabin and that is locally interrupted, the avionics bay module being installed in such a manner that the floor integral with the roof of the module locally extends the floor of the aircraft cabin;

the cockpit module includes a floor for walking on that is situated at a height that is lower than the height of the floor of the portion of the cabin space integrated in the roof of the avionics bay module; this arrangement makes it possible to enlarge the volume of the cockpit compared with the volume occupied by the prior art cockpit and thus to have a volume inside the module that is more accessible and easier to fit out; the volume of the cockpit module thus extends lower than the volume of the prior art cockpit, thereby encroaching on some of the poorly accessible zone of the bottom deck; this arrangement makes it possible to integrate elements in this volume of the module that previously needed to be integrated with difficulty around the landing gear bay;

the aircraft nose includes a bay for storing landing gear, and the two modules are configured to be arranged adjacent to the landing gear storage bay when they are installed inside the primary fuselage structure; this arrangement makes it possible to come closer to the landing gear bay and thus to reduce the volume around it that is difficult or even impossible to fit out;

the two modules are configured so as to be engaged one in the other via two respective adjacent edges of said modules when they are installed inside the primary fuselage structure; the interpenetration of the two modules one within the other serves to minimize the volumes that are lost (volumes that cannot be fitted out or that are very difficult to fit out) and to simplify the interconnections (electrical, air ducts, . . . ) between the modules; and the two modules engage one in the other via a front top edge of the avionics bay module and a rear bottom edge of the cockpit module.

The invention also provides a method of fitting out an aircraft nose, the aircraft nose comprising a primary fuselage structure that defines, inside said structure, a space for fitting out, the space being open at the rear end of the nose, the method being characterized in that it comprises the following steps:

introducing a cockpit module via the rear end of the nose;

moving the cockpit module in translation inside the primary fuselage structure towards the front end of the nose until it reaches a location reserved for housing said cockpit module;

fastening the cockpit module to the primary fuselage structure;

inserting an avionics bay module via the rear end of the nose;

moving the avionics bay module inside the primary fuselage structure towards the front end of the nose until it reaches a location reserved for housing said avionics bay module; and fastening the avionics bay module to the primary fuselage structure.

The method of integrating the two modules (built away from the assembly line) in two consecutive operations can be performed relatively simply and quickly (the movements involved are simple).

Since the modules are made before the integration stage and since each of them has a set of elements that are pre-installed and that are interconnected at least in part, the overall method of integrating the nose is considerably shorter than it used to be.

According to possible characteristics taken in isolation or in combination with one another:

the location reserved for housing the avionics bay module is arranged behind the location reserved for housing the cockpit module and at a height that is lower than the height of the cockpit module; it should be observed that the two modules have structures that are different because of the different natures of the environments they occupy: in particular, the front location situated close to the front end of the nose presents a cross-section that varies considerably, whereas the rear location reserved for the avionics bay module presents a cross-section that is substantially constant;

the space for fitting out is defined in the height direction of the primary fuselage structure by an aircraft cabin floor that separates a top space from a bottom face, the cabin floor extending horizontally from the rear end of the nose towards the front end of said nose up to a free end of the floor, the free end of the floor being arranged behind the location reserved for the avionics bay module; the arrangement of the free end of the floor arranged at a distance from the cockpit module (once installed) thus defines an opening between said end and the cockpit module, in which opening the avionics bay module is inserted in order to be installed;

each module is moved in turn in translation substantially horizontally inside the top face of the primary fuselage structure, the cockpit module being moved in translation until it reaches its location that is situated at the front end of the nose, at a height that is lower than the height that said cockpit module occupies while it is moving in translation over the cabin floor;

the avionics bay module is moved in translation:

in a first movement in translation that is substantially horizontal until it reaches a position situated over an opening defined between the free end of the floor and the cockpit module; and in a second movement in translation that is substantially vertical through said opening in order to reach its location situated at a height that is lower than the height of the location of the cockpit module;

the substantially vertical second movement in translation is accompanied by a forward tilting movement of the avionics bay module;

the two locations are arranged adjacent to a bay for storing nose landing gear; and the location reserved for housing the cockpit module is arranged over the bay for storing the landing gear.

BRIEF DESCRIPTION OF THE DRAWINGS

Other characteristics and advantages of the invention appear from the following description made by way of non-limiting illustration and with reference to the accompanying drawings, in which.

DETAILED DESCRIPTION OF THE PREFERRED EMBODIMENTS

Figure 3:
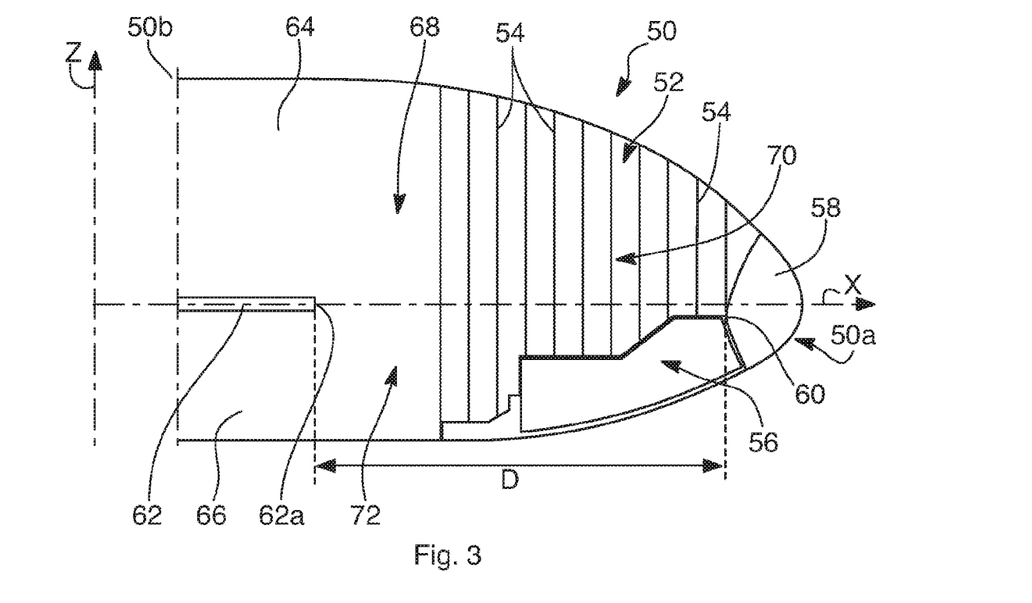
FIG. 3 is a general diagrammatic view in longitudinal section of an aircraft nose for fitting out in an embodiment of the invention.

As shown diagrammatically in FIG. 3 and given overall reference 50, an aircraft nose comprises a primary fuselage structure 52.

The primary fuselage structure 52 comprises in particular:

a plurality of mutually parallel fuselage frames 54 that are arranged longitudinally along the nose along the longitudinal axis X of the nose (the frames are shown in part using dashed lines, for reasons of clarity); and a bay 56 for storing nose landing gear (not shown) of the aircraft.

The nose 50 includes firstly a front end 50a housing a radome zone 58 defined by a radome partition 60, and secondly an open rear end 50b.

The nose 50 also has a cabin floor 62 that extends from the open rear end 50b longitudinally towards the front end. The cabin floor 62 is interrupted at a distance D from the partition 60 and it terminates in a free end 62a whereas, in the prior art (FIG. 1), the cabin floor extends as far as the radome partition.

In the height direction, the floor 62 separates the inside volume or space of the primary structure 52 that is to be fitted out into a rear top space 64 and a rear bottom space 66. These two spaces join together beyond the free end of the floor 62a to constitute a front overall empty space 68 that is to be fitted out.

The front overall space 68 has two locations, a front top location 70 arranged over the landing gear bay 56 and reserved for receiving a cockpit module, and a rear bottom location 72 reserved for receiving an avionics bay module.

The location 72 is arranged behind the location 70 and at a height that is lower than that of said location.

The two reserved locations 70 and 72 are arranged adjacent to the landing gear bay 56, the location 70 being above it and the location 72 being behind it.

Figure 4:
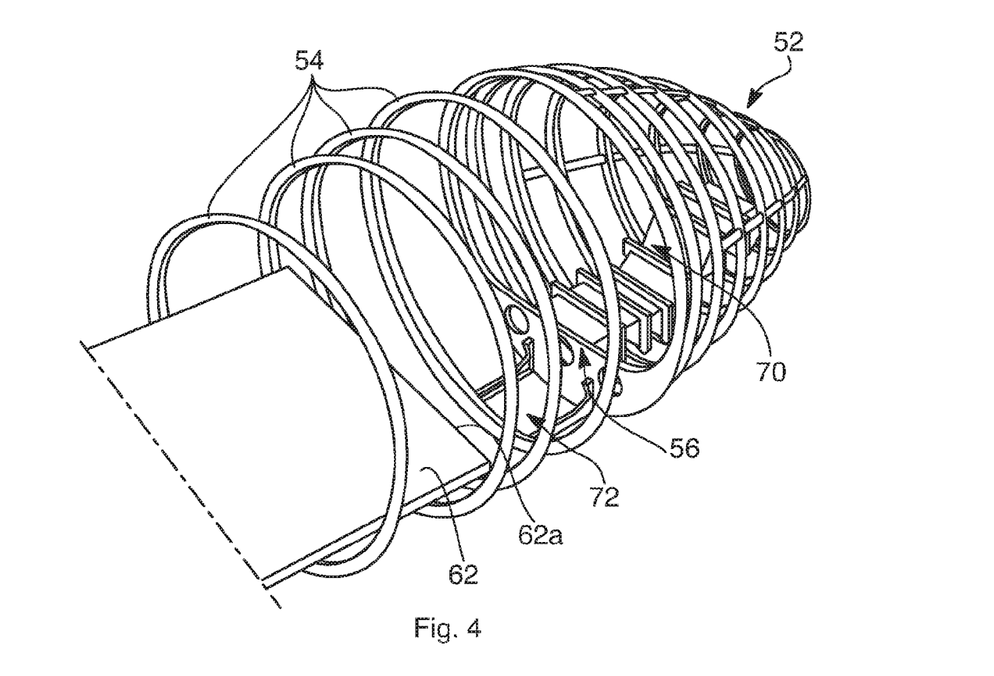
FIG. 4 is a rear perspective view of the primary fuselage section of the FIG. 3 nose.

FIG. 4 is a rear perspective view showing the primary fuselage structure 52 (frames 54 and bay 56), the interrupted cabin floor 62, and the two reserved locations 70 and 72 in the front overall empty space situated in front of the floor.

The cockpit module and the avionics bay module are both distinct modules that are pre-assembled outside the nose and that are to be integrated inside the primary structure 52 at the above-mentioned respective locations 70 and 72.

In general, the structure of each module comprises a plurality of elements fastened to one another in such a manner as to form an assembly that is suitable for being moved as a unit. These elements are connected or assembled together in such a manner as to impart mechanical cohesion to the assembly to enable it to be handled as a single physical entity or object while it is being integrated in the primary structure.

More particularly, each module structure comprises, integrated in the module, in particular a set of racks enabling it to receive various pieces of electrical and/or electronic equipment (electrical master boxes, computers, . . . ) dedicated to the module (cockpit or avionics bay) together with most of that equipment mounted on the racks (a predetermined portion of that equipment defined in advance when designing the module), the interconnections between the pieces of equipment, and ventilation systems elements (air ducts, couplings, . . . ), . . . .

The structure of the module is thus made up of a set of elements (racks, electrical and/or electronic equipment, interconnection elements between pieces of equipment, ventilation systems elements, . . . ) arranged in an unchanging predetermined configuration that is the configuration they are to have once the module has been integrated in the primary structure of the aircraft fuselage.

It should be observed that the two modules (prior to being installed in the aircraft) incorporate all or nearly all of the functions performed by the cockpit and the avionics bay.

More particularly, prior to installation, the cockpit module incorporates most of the functions performed by the cockpit and some of the functions of the avionics bay.

As for the avionics bay module, it incorporates most of the functions performed by the avionics bay.

In the reserved location, the structure of each module extends over the major portion of the horizontal transverse dimension measured along the axis Y (FIG. 2) and that is left free inside the primary structure 52.

Nevertheless, a certain amount of transverse clearance is conserved in order to enable the module to be fastened to the primary structure 52 and to accommodate fastener elements (e.g., rods and/or fittings).

The structure also extends in the height direction (axis Z in FIG. 3) in particular by means of racks for receiving or storing equipment that occupies the available space in the module.

Each module structure for installing in the primary structure thus forms a set of elements (racks, . . . ) that are already assembled to one another within the module structure and that remain in this configuration once the module structure has been installed.

Other satellite accessories, systems, and pieces of equipment may also be integrated subsequently in each structure depending on needs defined when designing the module.

Figure 5:
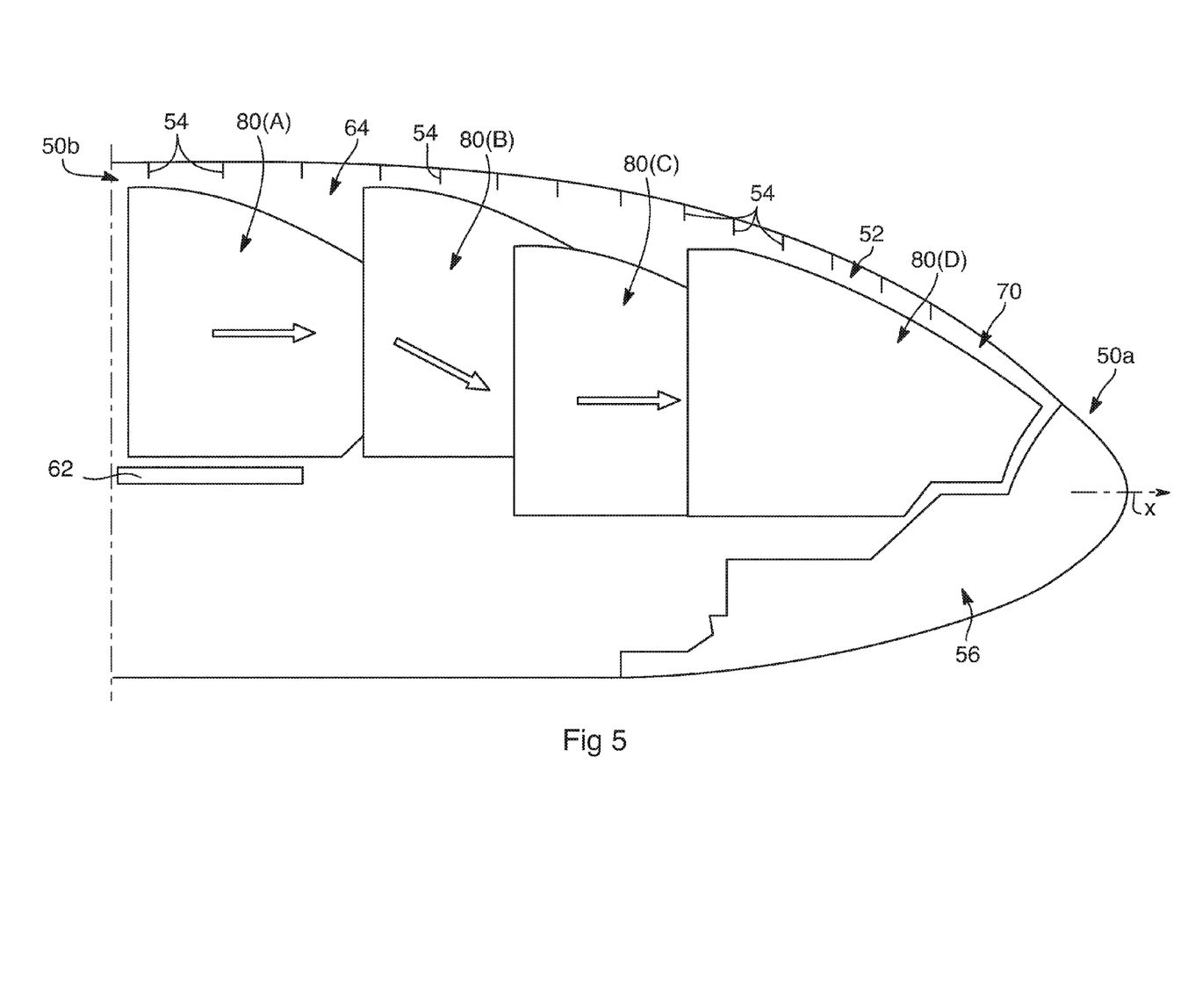
FIG. 5 is a general diagrammatic view showing a cockpit module being integrated in the FIG. 3 nose.
Figure 6:
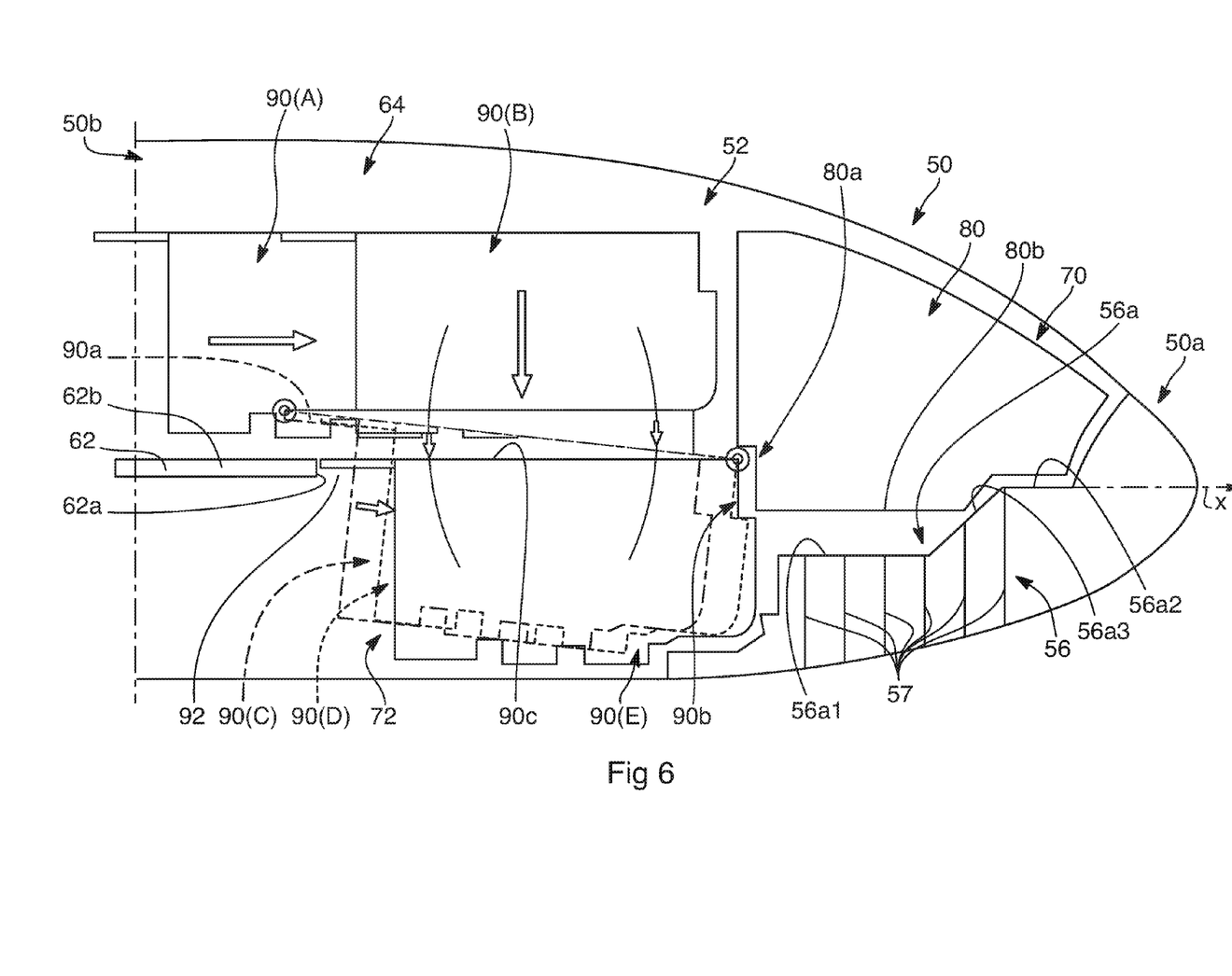
FIG. 6 is a general diagrammatic view showing an avionics bay module being integrated in the FIG. 5 nose.

FIGS. 5 and 6 show an implementation of a method of fitting out the aircraft nose of FIG. 3.

As shown in FIG. 5, a cockpit module 80 is moved into the inside of the primary structure 52 up to its reserved location 70.

To do this, a traveling crane (not shown) is installed with its rails arranged inside the primary structure 52 in the top portion thereof. The rails are fastened to the fuselage frames 54 and they extend over the front location 70.

The cockpit module 80 is attached by cables to wheels mounted on the rails of the traveling crane and it is inserted into the top space 64 via the open rear end 50b of the nose.

With the module 80 occupying the position 80(A) over the cabin floor 62, it is then moved in translation towards the front end 50a, as represented by various arrows, while being kept apart from the floor and from the top portions of the frames 54.

The movement in translation is substantially horizontal (along the longitudinal axis X) with a small vertical offset in order to go from the high intermediate position 80(B) to the low intermediate position 80(C) that is arranged facing the location 70.

The transition to the final position 80(D) is performed merely by moving in horizontal translation.

Once the cockpit module 80 has been installed in position above the landing gear bay 56, it is fastened to the primary structure 52 (frames 54 and bay 56), e.g., by a set of rods.

As shown in FIG. 6 the avionics bay module 90 is moved into the inside of the primary structure 52 up to its location 72.

In a manner similar to that described with reference to FIG. 5, the module 90 is inserted into the top space 64 via the rear end 50b and is suspended from the rails of the traveling crane.

With the module 90 occupying the position 90(A) over the cabin floor 62, it is then moved in translation with a first movement in horizontal translation towards the front end 50a. The module 90 is stopped in the position 90(B) once it is positioned over an opening 92 defined between the free end of the floor 62a and the cockpit module 80.

The module 90 is then lowered vertically through the opening 92 to occupy the bottom location 72.

The downward movement corresponds generally to a movement in vertical translation.

Nevertheless, given the dimensions of the opening 92, the shape of the module 90, and the shape of the module 80, the movement in vertical translation is somewhat adapted.

At its top edge, the module 90 has an extension or horizontal rim 90a. This rear rim 90a serves to fill the opening 92. For practical reasons of ease of installing the module through the opening 92, it may be useful to enlarge the dimensions of the opening compared with the overall size occupied by the module.

Nevertheless, in a variant, the module need not have the rear rim. The portion of the cabin floor constituted by the rear rim is then put into place after the module 90 has been installed in order to fill in the gap between the roof of the module and the floor of the cabin.

At its top front edge, the module 90 has a vertical setback 90b that is for interfitting within the bottom rear edge 80a of the module 80. This bottom rear edge 80a forms a vertical setback complementary to the setback 90b. It should be observed that the complementary setbacks of the two modules are optional.

Thus, the movement in vertical translation is accompanied by a forward tilting movement in order to pass from the inclined position 90(C) with the rear edge 90a raised so as to avoid coming into abutment against the free end 62a, and then a movement in longitudinal translation (substantially horizontally) towards the front in order to reach the position 90(D).

In this position, the top front edge 90b of the module 90 is positioned under the bottom rear edge 80a of the module 80 so as not to strike it during the operation and so as to make it possible subsequently to engage the two complementary setbacks mutually.

In the position 90(D), the rear edge 90a is arranged over the opening 92, thus making it possible during the final downward movement for it to be inserted in said opening and to remain therein once the module 90 has reached it reserved location 72 (final position 90(E)).

The module 90 is then fastened to the primary structure 52, e.g., by a set of rods and/or fittings.

In this position 90(E), the two modules 80 and 90 are engaged one with the other via their respective adjacent edges 80a and 90b, thus making it possible firstly to reduce the amount of bottom volume around the landing gear bay 56 that is unusable or difficult to use, and secondly to facilitate making the electrical interconnections and the connections with the air duct systems between the modules.

It should be observed that the bottom volume around the landing gear bay 56 may, for example, perform an air exchange function between the top and rear volumes, e.g., in the event of accidental explosive decompression.

Furthermore, the top face 90c of the module 90 is arranged to extend the top face 62b of the cabin floor, thereby providing geometrical continuity with the cabin floor.

The module 90 has a roof in its top portion, with its rear rim 90a constituting an extension and incorporating a floor for the cabin space situated over the module.

This floor having a top face 90c that is integral with the module 90 extends the cabin floor 62 horizontally over the opening 92 as far as the cockpit module 80. The roof of the module 90 thus closes the opening 92.

Once the modules 50 have been installed in the nose, the racks for receiving various pieces of equipment (performing the functions that are performed by a conventional avionics bay) and most of that equipment (an amount of equipment that is defined in advance when designing the modules) are already integral portions of the structure of the modules and therefore do not need to be installed, thereby greatly shortening the time required for integration on the final assembly line.

The equipment in the modules can subsequently be extended with certain pieces of electrical and/or electronic equipment (e.g., avionics computers) that are put into place on certain shelves of the racks after the modules have been installed in the aircraft.

The pieces of equipment added to the modules are connected to one another and to the electrical and/or electronic systems and equipment (and indeed the ventilation systems elements such as ducts, couplings, . . . ) that were already incorporated in each module. All of the necessary connections (electricity, air) between the various elements inside each module are pre-established before the module is installed, thus representing a considerable saving in time on the final assembly line. Thereafter, each module is fully connected to the electrical and/or electronic and ventilation systems provided on the primary fuselage structure of the aircraft via interface elements that are already present in the module.

As shown in FIG. 6, the module 80 has a floor 80b for walking on that is situated at a height that is lower than the height of the cabin floor 62 and its extension into the roof of the module 90.

The volume of the module 80 is thus enlarged compared with the volume of the prior art cockpit zone 24 (FIG. 2).

It is thus possible (prior to installing the module in the aircraft) to incorporate inside the cockpit module 80 the racks and (electrical and/or electronic, air, . . . ) systems and equipment that were previously arranged around the landing gear bay 56 and that required numerous connections to be made between the cockpit and the bottom zone. The mechanical and electrical connections between the cockpit and the zone situated under the cockpit are thus considerably reduced in number and simplified. The cockpit module 80 thus possesses a better integration coefficient.

By increasing the size of the space dedicated to the cockpit, the volume that is difficult to fit out and situated under the cockpit module is reduced.

It should be observed that lowering the floor for walking on 80*b* is made possible by the generally staircase-shaped profile of the roof 56*a* of the landing gear bay 56.

The roof thus has a bottom wall 56*a*1 and a top wall 56*a*2 that are plane and that are spaced apart from each other by a sloping wall 56*a*3 forming a riser.

This shape for the roof 56*a* is designed to fit as closely as possible to the shape of the landing gear in its retracted position inside the landing gear bay.

The two modules 80 and 90 as installed in this way as close as possible around the landing gear bay 56 contribute to reducing the amount of volume that is lost, or in any event the amount of volume that is difficult to fit out around the landing gear bay.

Because of the pre-assembled module structures, the overall time required for integrating the nose on the final assembly line is considerably shortened. It is thus possible to maintain high rates of production.

Furthermore, the primary fuselage structure can be simplified in the zones where the modules are installed because of a large reduction in systems interfaces between firstly the primary structure and secondly the racks, equipment, and systems. For the most part, these interfaces are integrated directly in the modules, i.e., away from the final assembly line. Savings in costs and in weight are also obtained.

Figures 7, 8A, 8B:
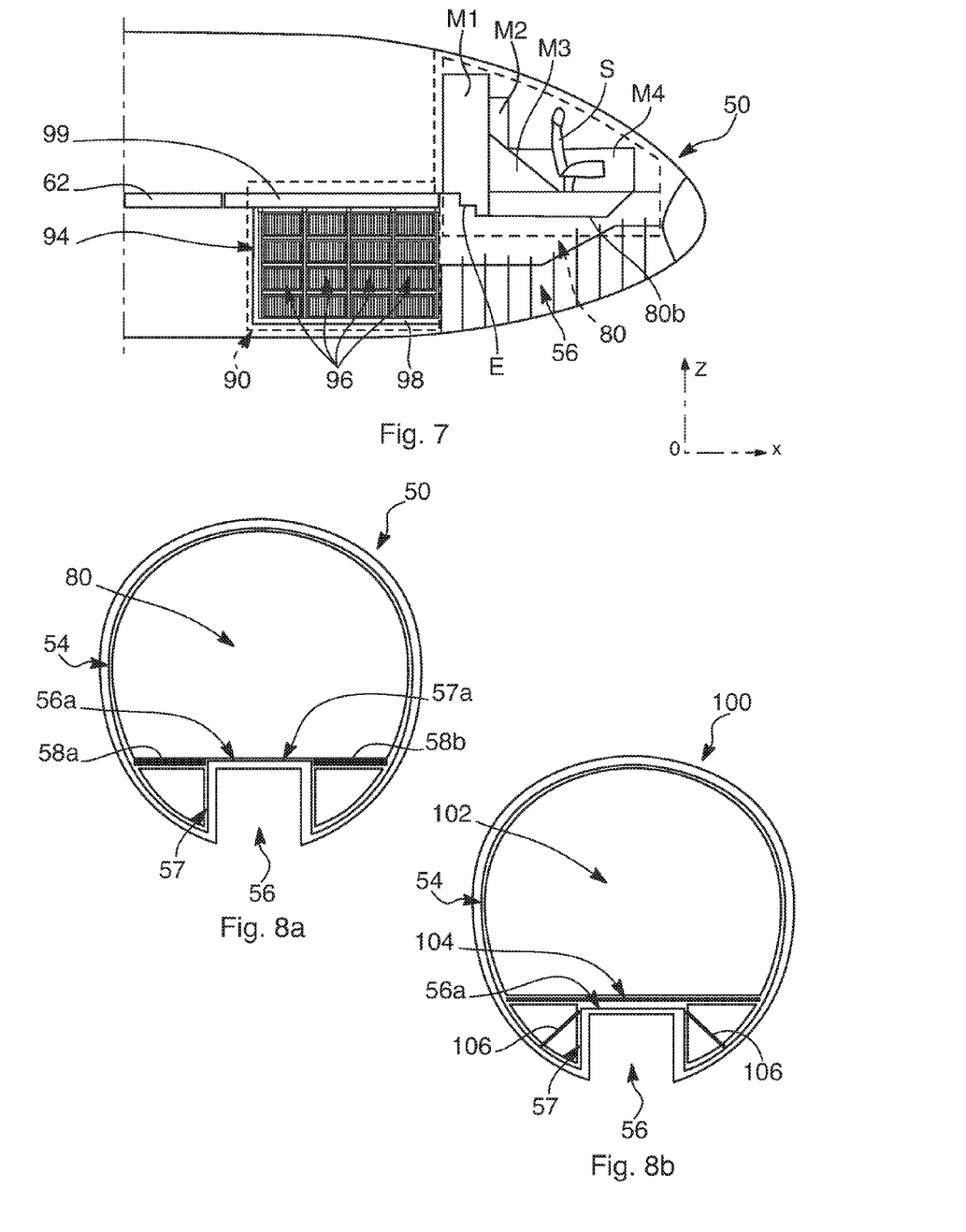
FIG. 7 is a diagrammatic view on a smaller scale of the FIG. 6 aircraft nose showing the inside of the cockpit module and of the avionics bay module in an embodiment of the invention.
FIGS. 8a and 8b are general diagrammatic views in cross-section of the nose of FIGS. 6 and 7 in two possible different embodiments.

FIG. 7 is a diagrammatic illustration of an embodiment of the cockpit module and the avionics bay module installed in the aircraft nose 50 of FIG. 6.

This figure shows the cockpit module 80 that has a plurality of racks M1 to M4 that are assembled to one another and that contain in particular electrical and/or electronic equipment, interconnection elements, and ventilation system elements (ducts, couplings, . . . ) that are not visible, together with various elements such as the pilot seat S, the instrument panels, the pedals, . . . . The visible portion of the module constitutes a submodule and the cockpit module has two such submodules that are symmetrical and spaced apart from each other by a central passage provided with a stair E and a floor 80*b* for walking on that is lower than the cabin floor 62 as explained above with reference to FIG. 6. It is possible to the floor for walking on because of the staircase-shaped configuration (with a sloping riser) of the roof of the landing gear bay 56 as shown in FIG. 3.

The module is designed and installed in the aircraft with its two submodules constituted in the above-described manner.

The avionics bay module 90 also has two submodules, each formed by a longitudinal row 94 of avionics racks having shelves 96, which racks are assembled/fastened to one another via common transverse vertical structural risers. The racks carry in particular electrical and/or electronic equipment installed on the shelves. In FIG. 7, only one of the rows 94 of racks is shown together with the central passage that separates the two rows and along which there is fastened a floor 98 for walking on. The roof 99 of the module that acts as the cabin floor and that extends the interrupted cabin floor 62 extends transversely (axis Y) so as to unite the tops of the two parallel rows of racks.

FIGS. 8*a* and 8*b* are respective cross-section views of an aircraft nose.

FIG. 8*a* is a cross-section view of the nose 50 shown in FIG. 6. In FIGS. 6 and 8*a*, reinforcing crossbeams 57 (of generally upside-down U-shape) of the landing gear bay 56 are mounted around the landing gear bay, on its side flanks and on its roof 56*a*.

Each of these crossbeams 57 is connected in its bottom portion to the fuselage frame 64 that is located in the same cross-section as the crossbeam, as shown in FIG. 8*a*.

Two horizontal transverse mechanical connection elements 58*a* and 58*b*, such as rods, are each fastened at one end to a portion of the frame 54 and at the opposite end to the horizontal portion 57*a* of the reinforcing crossbeam 57.

These elements 58*a*, 57*a*, and 58*b* in alignment are designed to work in traction. The element 57*a* can also work in bending, since it takes up the load from the pressurized panels of the roof of the landing gear bay. Nevertheless, the elements 58*a* and 58*b* do not work in bending.

This mechanical connection between landing gear bay 56 and the fuselage frame 54 makes it possible to perform the function of taking up the mechanical forces exerted on the frames under the effect of pressurization.

This function of taking up forces is performed in the prior art by the structural portion of the cockpit floor (cross-members, . . . ).

Integrating this function in the landing gear bay 56 enables the floor 20 of FIG. 1 to be simplified by reducing the floor in the cockpit module 80 to no more than a floor for walking on 80*b*.

As a result, the thickness of the cockpit floor is reduced and the floor for walking on in the cockpit can be lowered and positioned closer to the roof of the landing gear bay than in the prior art.

It should be observed that for the floor for walking on 80*b* no longer serves as a support for various systems, equipments, and racks. For example, it is made as an assembly of composite panels.

FIG. 8*b* shows a variant embodiment of FIG. 8*a*.

The nose 100 has a cockpit module 102 identical to the module 80 except that it does not come down so far towards the landing gear bay 56 as the module 80. The nose 100 is identical to the nose 50 concerning its other portions, which are not described again.

In this variant, transverse mechanical connection elements 104 (e.g., cross-members) that are suitable for working in traction only extend horizontally without interruption over the bay 56 between two opposite points of a single frame 54. Oblique transverse rods 106 connect the crossbeams 57 to the frames 54.

Since the connection elements 104 do not work in bending, they may be smaller in height than conventional floor cross-members. This makes it possible to lower the floor for walking on of the cockpit module 102 relative to the height of the floor 20 in FIG. 1. Since these elements 104 overlie crossbeams and are not in alignment therewith, it is nevertheless not possible to lower the floor for walking on as much as in FIG. 8*a*. The volume of the module 102 is thus increased to a lesser extent than the volume of the module 80.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft nose comprising a primary fuselage structure, and housed inside said structure:
   a cockpit; and
   an avionics bay containing a plurality of avionics racks receiving at least one of electrical or electronic piece of equipment;
   the cockpit and the avionics bay each being made in the form of a distinct module that is suitable for being installed in a single operation inside the primary fuselage structure.

2. An aircraft nose according to claim 1, wherein each module comprises a plurality of elements fastened to one another in such a manner as to form an assembly that is suitable for being moved as a unit.

3. An aircraft nose according to claim 1, wherein the cockpit module and the avionics bay module together incorporate substantially all of the functions performed by the cockpit and the avionics bay.

4. An aircraft nose according to claim 1, wherein the cockpit module incorporates most of the functions performed by the cockpit and some of the functions of the avionics bay, and the avionics bay module incorporates a majority of the functions performed by the avionics bay.

5. An aircraft nose according to claim 1, wherein the shape of each module is adapted firstly to being transported through a top space inside the primary fuselage structure, and secondly to the location in the primary fuselage structure in which it is integrated.

6. An aircraft nose according to claim 1, wherein the avionics bay module extends towards the rear of the nose under a portion of a top space dedicated to a passenger cabin, and it is situated at a height that is lower than the height of the cockpit module.

7. An aircraft nose according to claim 6, wherein the avionics bay module includes a roof incorporating the floor of the portion of the passenger cabin space.

8. An aircraft nose according to claim 7, wherein, inside the primary fuselage structure, the aircraft nose includes an aircraft cabin floor arranged under the top space dedicated to a passenger cabin and that is locally interrupted, the avionics bay module being installed in such a manner that the floor integral with the roof of the module locally extends the floor of the aircraft cabin.

9. An aircraft nose according to claim 7, wherein the cockpit module includes a floor for walking on that is situated at a height that is lower than the height of the floor of the portion of the cabin space integrated in the roof of the avionics bay module.

10. An aircraft nose according to claim 1, wherein the aircraft nose includes a bay for storing landing gear, and the two modules are configured to be arranged adjacent to the landing gear storage bay when they are installed inside the primary fuselage structure.

11. An aircraft nose according to claim 1, wherein the two modules are configured so as to be engaged one in the other via two respective adjacent edges of said modules when they are installed inside the primary fuselage structure.

12. An aircraft nose according to claim 11, wherein the two modules engage one in the other via a front top edge of the avionics bay module and a rear bottom edge of the cockpit module.

13. A method of fitting out an aircraft nose, the aircraft nose comprising a primary fuselage structure that defines inside said structure a space for fitting out, the space being open at a rear end of the nose, the method comprising the following steps:
   introducing a cockpit module via the rear end of the nose;
   moving the cockpit module in translation inside the primary fuselage structure towards the front end of the nose until it reaches a location reserved for housing said cockpit module;
   fastening the cockpit module to the primary fuselage structure;
   inserting an avionics bay module via the rear end of the nose;
   moving the avionics bay module inside the primary fuselage structure towards the front end of the nose until it reaches a location reserved for housing said avionics bay module; and
   fastening the avionics bay module to the primary fuselage structure.

14. A method according to claim 13, wherein the location reserved for housing the avionics bay module is arranged behind the location reserved for housing the cockpit module and at a height that is lower than the height of the cockpit module.

15. A method according to claim 13, wherein the space for fitting out is defined in the height direction of the primary fuselage structure by an aircraft cabin floor that separates a top face from a bottom face, the cabin floor extending horizontally from the rear end of the nose towards the front end of said nose up to a free end of the floor, the free end of the floor being arranged behind the location reserved for the avionics bay module.

16. A method according to claim 15, wherein each module is moved in turn in translation substantially horizontally inside the top face of the primary fuselage structure, the cockpit module being moved in translation until it reaches its location that is situated at the front end of the nose, at a height that is lower than the height that said cockpit module occupies while it is moving in translation over the cabin floor.

17. A method according to claim 16, wherein the avionics bay module is moved in translation:
   in a first movement in translation that is substantially horizontal until it reaches a position situated over an opening defined between the free end of the floor and the cockpit module; and
   in a second movement in translation that is substantially vertical through said opening in order to reach its location situated at a height that is lower than the height of the location of the cockpit module.

18. A method according to claim 17, wherein the substantially vertical second movement in translation is accompanied by a forward tilting movement of the avionics bay module.

19. A method according to claim 13, wherein the two locations are arranged adjacent to a bay for storing nose landing gear.

20. A method according to claim 19, wherein the location reserved for housing the cockpit module is arranged over the bay for storing the landing gear.

21. An aircraft nose comprising a primary fuselage structure, and housed inside said structure:
   a cockpit; and
   an avionics bay containing a plurality of avionics racks receiving at least one of an electrical or electronic piece of equipment;
   the cockpit and the avionics bay each being made in the form of a distinct module that is suitable for being installed in a single operation inside the primary fuselage structure;

wherein the avionics bay module extends towards the rear of the nose under a portion of a top space dedicated to a passenger cabin, and it is situated at a height that is lower than the height of the cockpit module; and wherein the avionics bay module includes a roof incorporating the floor of the portion of the passenger cabin space.

* * * * *